June 27, 1967 J. P. BELTZ 3,328,760

CHARACTER READER FOR READING MACHINE PRINTED CHARACTERS AND HANDWRITTEN MARKS

Filed Dec. 23, 1963 3 Sheets-Sheet 1

INVENTOR
JOHN P. BELTZ

BY John V. Regan
ATTORNEY

June 27, 1967 J. P. BELTZ 3,328,760
CHARACTER READER FOR READING MACHINE PRINTED CHARACTERS AND HANDWRITTEN MARKS Filed Dec. 23, 1963 3 Sheets-Sheet 2

INVENTOR.
JOHN P. BELTZ
BY John V. Regan
ATTORNEY

INVENTOR.
JOHN P. BELTZ
BY John V. Regan
ATTORNEY

United States Patent Office 3,328,760
Patented June 27, 1967

3,328,760
CHARACTER READER FOR READING MACHINE PRINTED CHARACTERS AND HANDWRITTEN MARKS

John P. Beltz, Willingboro, N.J., assignor to Radio Corporation of America, a corporation of Delaware Filed Dec. 23, 1963, Ser. No. 332,816
4 Claims. (Cl. 340—146.3)

This invention relates to optical character readers, and more particularly to character readers which read and recognize handwritten marks as well as printed characters.

Certain optical character readers electro-optically scan characters printed on a document and recognize the characters by the distinctive sets of video signals produced when different characters are scanned. The term "character" is utilized throughout the specification to denote alphabetic, numeric, and other symbols which are printed on a document by printing apparatus. The documents being read may, for example, comprise turn-around documents, i.e., documents printed by a computer-operated printer and subsequently returned to be read by the character reader so as to provide an input for the computer. To increase the usefulness and flexibility of such character readers, it is desirable that the character reader be capable of reading handwritten marks as well as printed characters. Such handwritten marks may be made on the document by a clerk using a pencil, a pen, or the like, prior to forwarding the document to the character reader. The handwritten marks may, for example, be utilized to generate a control signal which provides an input to the computer that is additional to the video information signals generated by the printed characters. The ability of a character reader to read handwritten marks offers a simple and inexpensive method of adding variable information to the document, thereby eliminating the necessity of providing complex and expensive printers or typewriters to add this information. Furthermore, handwriting marks on a document sometimes takes less time than machine printing them, does not require specially trained employees, and avoids the insertion and withdrawal of the document into and from a machine.

Accordingly, it is an object of this invention to provide a character reader capable of reading handwritten marks as well as printed characters.

It is another object of this invention to increase the usefulness and flexibility of a character reader by incorporating therein a handwritten mark sensing circuit.

A character reader embodying the invention reads handwritten marks on a document as well as characters printed thereon. The handwritten marks may, for example, comprise long vertical stroke marks which are made by a pencil, or the like, so as to be greater in height than the normal printed characters on the document. A sensing circuit is provided to recognize the handwritten marks. The character reader stores the stroke feature signals derived from scanning the marks handwritten on the document and the sensing circuit measures the height, or duration, of the stored feature signals. The greater height of the handwritten marks as compared to the printed characters may be the basis for recognizing the handwritten marks. A control signal is generated by the character reader when a handwritten mark is recognized.

Figure 1:
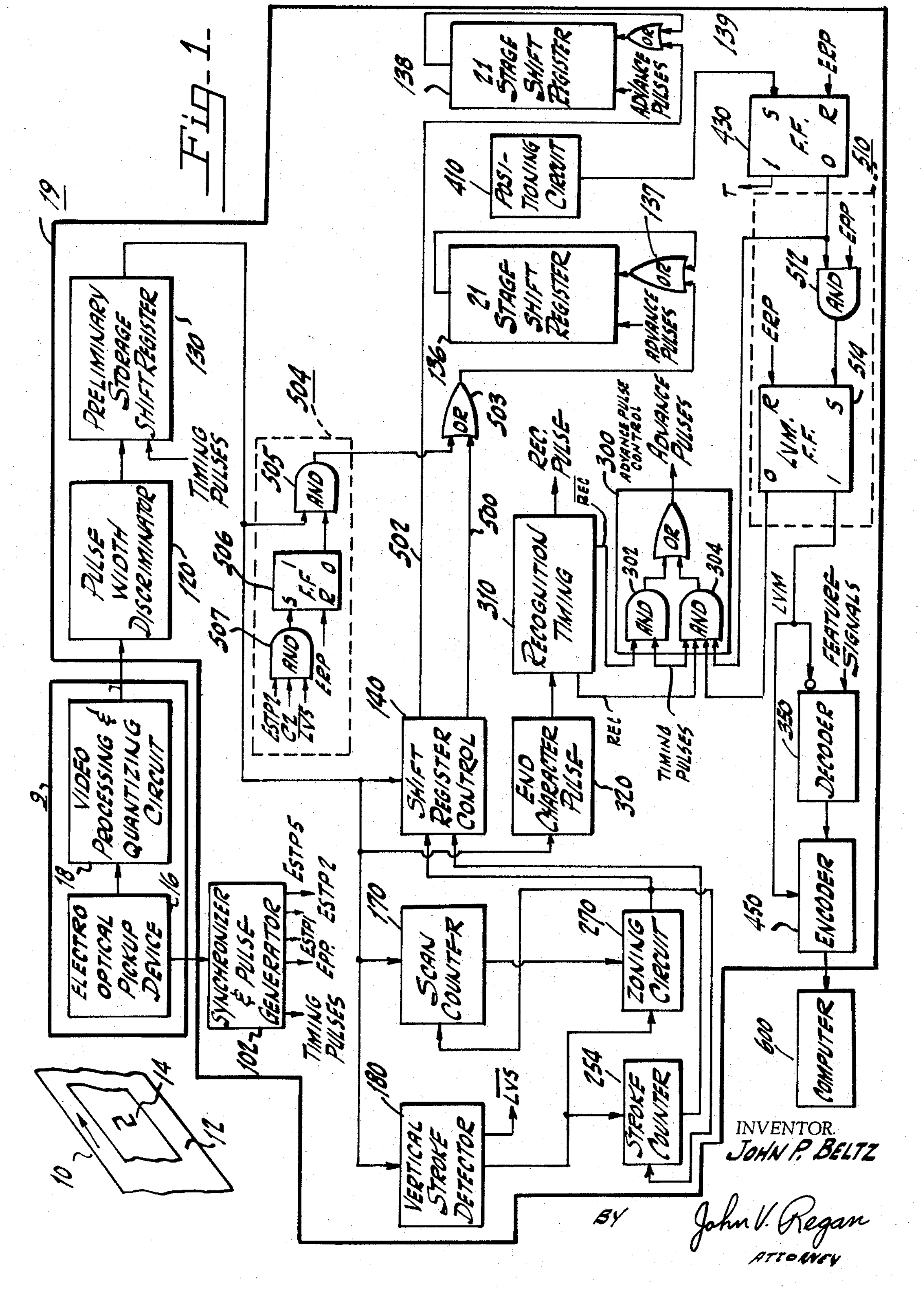
FIGURE 1 is a schematic block diagram of a character reader embodying the invention.

Referring now to FIGURE 1, a schematic block diagram of a character reader embodying the invention as shown. The character reader shown in FIGURE 1 may, for example, include a scanning system 9 such as that disclosed in a copending application for Seymour Klein entitled "Optical Scanning System for Character Reader," Ser. No. 237,949, filed Nov. 15, 1962, and a character recognition system 19 such as that disclosed in a copending application for Seymour Klein et al., entitled "Character Reader," Ser. No. 253,911, filed Jan. 25, 1963, both of which are assigned to the same assignee as the present invention. The present application describes only so much of the scanning system 9 and recognition system 19 of the copending applications as necessary to understand the present invention. For convenience, the present application utilizes the same reference numerals for identical components that are used in the recognition system 19 of the copending application.

The character reader includes a transport mechanism 10 for carrying documents 12 having characters 14 printed thereon. The document 12 is carried by the transport mechanism 10 at a substantially constant velocity of, for example, 150 inches per second in the direction of the arrow shown in FIGURE 1. An electro-optical pickup device 16 is positioned so that the characters 14 are imaged thereon and scanned successively. The pickup device 16 may, for example, comprise a photoconductive camera tube such as a vidicon camera tube. The generated video signals derived from the pickup device 16 include feature signals which occur whenever the scanning beam (not shown) of the pickup device 16 intercepts the outline trace of the characters 14. The video signals generated in the pickup device 16 are applied to a video processing and quantizing circuit 18 which processes the video signals to provide uniform amplitude pulses having fast rise and fall times. The quantized video signals, which are digitized in amplitude, are then applied to a character recognition system 19 which recognizes the signals as particular characters and encodes the characters into a binary coded form.

Figure 2:
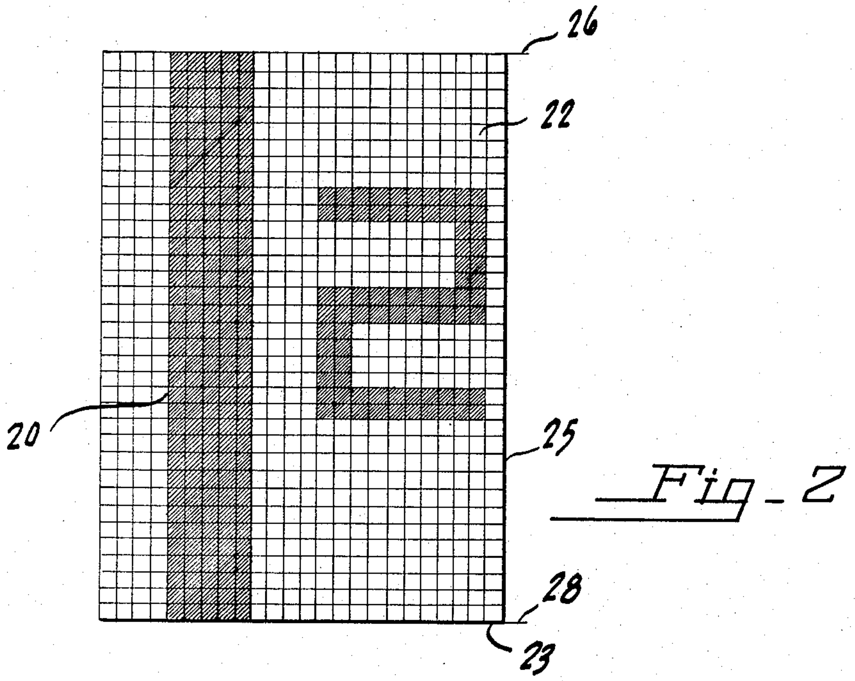
FIGURE 2 is a diagramamtic illustration of the scanning of an individual handwritten mark and an individual printed character.

The method of scanning an individual character, the numeral "2," is showin in FIGURE 2. A handwritten mark, the long vertical stroke mark 20, is also shown in FIGURE 2 but the discussion of the scanning of this mark will be deferred until later. The area surrounding the character "2," as well as the character itself, is shown divided into a plurality of square segments or elements 22. The area of each of the elements 22 is substantially equal to or greater than the resolution of the scanning beam of the pickup device 16. The scanning beam of the pickup device 16 may, for example, exhibit a 7 milli-inch area on the target (not shown) of the pickup device 16.

In scanning a character, the scanning beam of the pickup device 16 is repeatedly deflected vertically so that the character is scanned from top to bottom while simultaneously the document 12 is moved from left to right by the transport mechanism 10. Thus, each character on the document 12 is effectively scanned orthogonally and successively by a plurality of scanlines 23 (the succession of elements 22 of a vertical direction). The scanlines 23 commence at the right and end at the left of the character "2" to provide a scanning raster 25. Such a vertical line scanning technique emphasizes the recognition of a character by the vertical strokes occurring therein rather than by the horizontal strokes. This emphasis is desired because computer-operated high speed printers often tend to omit either the top and/or botom horizontal strokes in a character.

The scanning cycle of the scanning device 16 comprises a relatively slow vertical trace scan starting from an initial position 26 above the character being scanned and ending at a terminal position 28 below the character. The trace scan is followed by a rapid retrace back to the initial position 26. The pickup device 16 is blanked by periodically recurring blanking pulses which occur during retrace so that no character image signals are produced during this interval.

In one embodiment of the character reader constructed to read characters printed by a computer-operated printer utilizing a 7 x 5 matrix font, the printed characters are approximately .098 inch high and .07 inch wide. With the transport mechanism 10 exhibiting a velocity of 150 inches per second, the time it takes for each character to pass a scanning point is 466.7 microseconds. A perfectly formed character from such a front may be recognized from the feature signals generated in 10 scans of the character. Consequently, each scan is 46.67 microseconds in duration. Each scan is divided into 42 equal time periods, each comprising substantially 1.1 microseconds. Of the 42 time periods, 34 comprise the active or trace portion of the scanning cycle, wherein feature signals are produced, and 8 comprise the retrace portion of the cycle, wherein no feature signals are produced. Consequently, the scannning raster 25 in FIGURE 2 is shown divided into 34 elements in height to denote the trace portion of the scanning cycle. Additionally, the character "2" is shown as 10 elements wide to denote the fact that 10 scans are required to completely scan the character. The character "2" is 14 elements high and thus the scanning beam effectively overscans the character approximately 2.5 times. For the purposes of explanation throughout the specification, the elements 22 are utilized to measure time, as well as length and height. Additionally, the video signals are referred to as containing black elements when the outline trace of a character is intercepted by the scanning beam and as containing white elements when the outline trace is not intercepted. The terms "black" and "white" correspond, respectively, to the black or dark print of the characters 14 and the white or light background of the document 12.

Referring back to FIGURE 1, a synchronizing circuit and pulse generator 102 is coupled to both the scanning system 9 and character recognition system 19. The generator 102 generates the timing pulses which are applied to synchronize the scanning of a character with the flow of feature information signals produced by this scanning through the character recognition system 19. The generator 102 includes a 900 kilocycle clock oscillator which is coupled to drive a 7-stage ring counter (not shown). The ring counter is in turn coupled to drive a 6-stage ring counter (not shown). Thus, 42 timing pulses with a period of 1.1 microseconds are generated by the generator 102. It is to be noted that the elements 22 of FIGURE 2 coincide in duration with the timing pulses. Thus, the timing pulses provide the basis for breaking the scannning raster 25 into the plurality of elements 22.

The quantized video signals derived from the scanning system 9 are applied to a pulse width discriminator 120 in the character recognition system 19. The pulse width discriminator 120 blocks all pulses below a predetermined minimum width of, for example, 750 nanoseconds to remove spurious noise signals. The discriminator 120 also enlarges all pulses that are passed so that every pulse is at least 1.1 microseconds in duration. The 1.1 microsecond pulse width is identical to one element 22 in the scanning raster 25 of FIGURE 2.

The pulses from the discriminator 120 are applied to a preliminary storage shift register 130 for temporary storage. The shift register 130 may, for example, comprise a 4-stage shift register into which video signals are serially advanced by a train of timing pulses derived from the pulse generator 102. The timing pulses occur at the 900 kilocycle clock rate and thus the shift register 130 functions to translate the video signals, which are digitized in amplitude, into signals which are also digitized in time.

The feature signals initially stored in the shift register 130 are applied through a shift register control circuit 140 to a pair of shift registers 136 and 138 to be stored therein. The feature signals are advanced into the registers 136 and 138 by advance pulses derived from an advance pulse control circuit 300. The advance pulse control circuit 300 is in turn driven by the 900 kilocycle timing pulses derived from the pulse generator 102. The shift registers 136 and 138 may, for example, each comprise 21 serially connected shift register stages with the last stage of each register coupled back through OR gates 137 and 139, respectively, to the first stage thereof. The 21 stages of the registers is exactly one-half the number of timing pulses in a complete vertical scan including both trace and retrace intervals. Therefore, during one complete scan of a character the information signals are serially shifted through the registers twice. The first and second shift registers 136 and 138 function as the main storage devices in the character recognition system 19 for the major feature signals. The major features of a character that are relied upon for differentiating one character from another are the vertical strokes which occur in most characters, such as the upper right and lower left medium vertical strokes in the character "2" in FIGURE 2. Other characters may include a long vertical stroke such as the long vertical right stroke in the character "9." Both the long and medium vertical stroke feature signals are stored in the shift registers 136 and 138 pending the completion of the scanning of the character.

The vertical stroke feature signals derived from scanning the righthand portion or zone 1 of a character are gated by the shift register control circuit 140 to be applied through leadline 500 to the shift register 136. The vertical stroke feature signals derived from scanning either the center zone 2 or left zone 3 of a character are gated by the shift register control circuit 140 to be applied through leadline 502 to the shift register 138. The utilization of one shift register, the register 138, to store feature signals from both zones 2 and 3 of a character is made possible by designing a font specifically to avoid the inclusion of both center and left vertical strokes in a character. With such a font, only two shift registers are used in the recognition system 19.

The flow of the stroke feature signals through the gating or shift register control circuit 140 is under the control of a zoning circuit 270. The zoning circuit 270 generates a zone 1 signal level when the righthand portion of a character is being scanned, a zone 2 signal level when the center portion of a character is being scanned, and a zone 3 signal level when the lefthand portion of a character is being scanned. Additionally, the zoning circuit 270 generates a transition pulse at the end of each of the zones 1 and 2. In characters which include only left and right vertical strokes, the zoning pulse at the end of zone 1 is normally generated when the transition from scanning a vertical stroke is detected, whereas the zoning pulse at the end of zone 2 is normally generated when the transition to scanning a vertical stroke is detected.

A vertical stroke detector circuit 180 is coupled to the preliminary storage shift register 130 to detect the fact that a vertical stroke in a character is being scanned. The vertical stroke detector 180 recognizes a medium vertical stroke signal when the feature signals contain 5 successive black elements and generates a medium vertical stroke level signal MVS. The vertical stroke detector 180 also generates a long vertical stroke signal LVS when the feature signals contain at least 10 successive black elements.

A stroke counter 254 is coupled to the vertical stroke detector 180 to count the number of times vertical strokes in particular zones of a character are detected. Thus, the stroke counter 254 is gated and reset by the zoning circuit 270. The stroke counter 254 is coupled to the shift register control circuit 140 to permit only two scans of a vertical stroke in either zone 1 or zone 3 to flow into the shift registers 136 and 138, respectively. This is done to insure that when a vertical stroke is scanned, the background noise, due to smears on the document, etc., or the skewing of the document does not insert more black elements into the shift registers 136 and 138 than those that occur in the vertical stroke itself.

A scan counter 170 is coupled to the preliminary storage shift register 130 to count the number of scans that occur in each zone of a character. The scan counter 130 is initiated to start counting in zone 1 of a character and reset by the zoning circuit 270 at the transition from one zone to another.

At the end of scanning a character, an end character pulse circuit 320 detects the absence of black elements in the preliminary storage shift register 130 and generates an end character pulse. The end character pulse is applied to a recognition timing circuit 310. The recognition timing circuit 310 produces a recognition signal level REC which initiates the recognition cycle to ascertain the identity of the character scanned. Prior to this, during the active scanning of a character, the recognition timing circuit 310 produces a signal level $\overline{REC}$. The signal $\overline{REC}$, in conjunction with the train of timing pulses from the pulse generator 102, generates in the AND gate 302 in the advance pulse control circuit 300 to advance pulses to shift the various registers in the recognition system 19. When the recognition signal level REC is generated, the AND gate 302 is deactivated but the AND gate 304 is activated to produce the advance pulses. The AND gate 304 generates advance pulses until the stroke feature signals are properly positioned in the first and second shift registers 136 and 138.

The vertical stroke feature signals stored in the registers 136 and 138 may be in any random position depending upon the location of the character in the scanning raster 25 of FIGURE 2. The correct positioning of the top and bottom of the stroke feature signals stored in the registers 136 and 138 is essential to distinguish one character from another. For example, the numerals "5" and "2" each contain left and right medium vertical strokes which must be correctly identified as to their proper location, i.e., upper or lower, to differentiate between these characters. The vertical stroke feature signals are positioned in the registers 136 and 138 by a positioning circuit 410. The positioning circuit 410 is coupled to set a positioning flip-flop 430 when the stroke feature signals are correctly positioned. The positioning flip-flop 430 produces at its "1" output terminal a signal level T when set. The "0" output level also changes to disable the AND gate 304 in the advance control pulse circuit 300 to block any further shifting of the feature signals in the registers 136 and 138.

Figure 3:
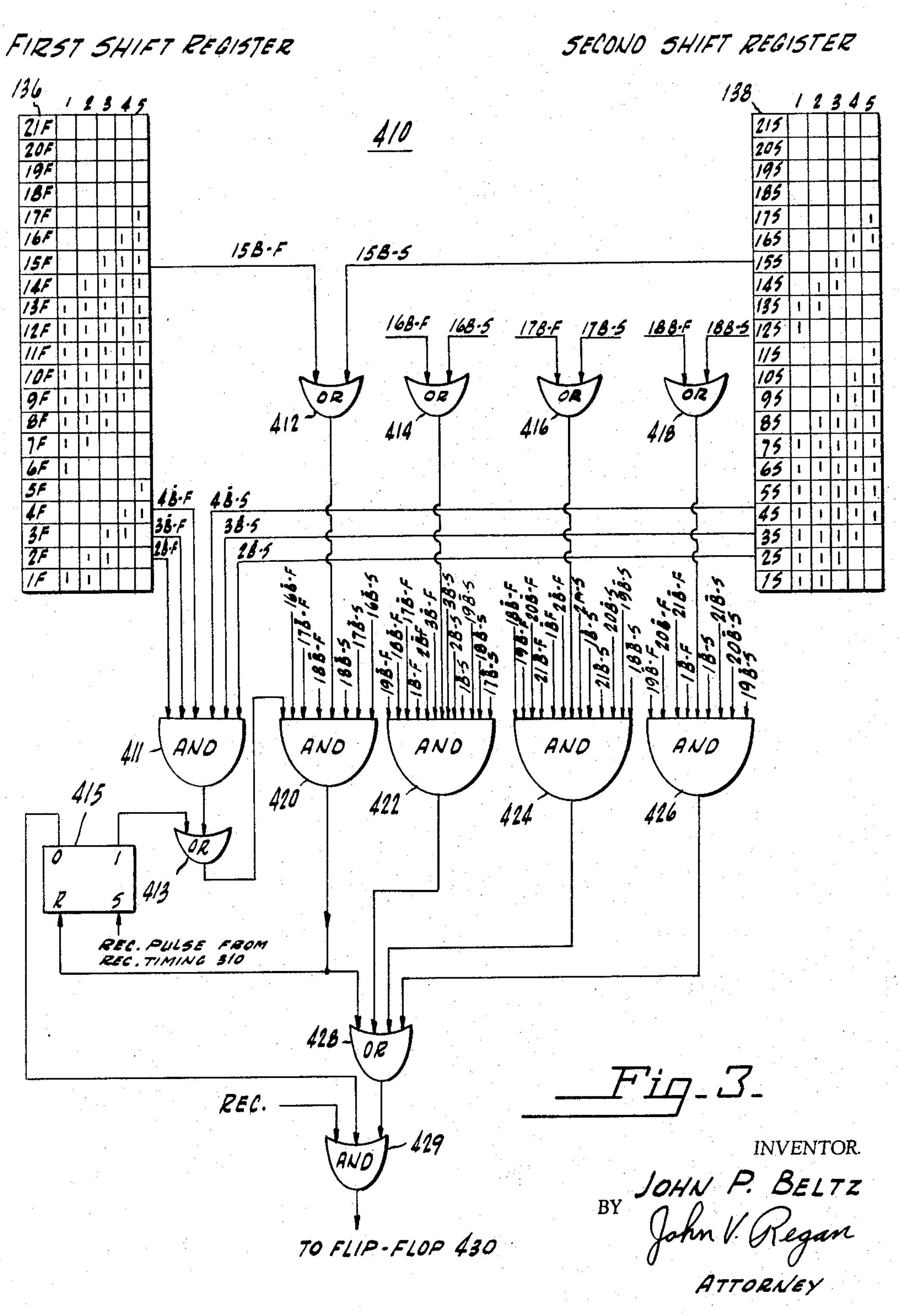
FIGURE 3 is a detailed schematic circuit diagram of a positioning circuit utilized in the character reader of FIGURE 1; and, FIGURE 4 is an illustration of a document that includes both printed characters and handwritten marks which is helpful in understanding the invention.

The positioning circuit 410 is shown in detail in FIGURE 3. The black lines in the various stages in column 1 of the schematic representation of the shift registers 136 and 138 represent the stored black elements derived from scanning the numeral "2" in FIGURE 2 at the time the recognition timing signal REC is produced. The various leadlines from the shift register stages are labeled to indicate when the leadlines become active. Thus, the leadline 15B–F indicates that this line is active when a black element is stored in the 15th stage of the first shift register 136. The leadline labeled 4$\overline{B}$–S indicates that this line becomes active when a white element is stored in the 4th stage of the second shift register 138.

The positioning circuit 410 positions the stroke feature signals derived from scanning normal height characters in two steps. The first step locates the top of the stroke feature signals while the second step locates the bottom and also centers the feature signals. Thus, the flip-flop 415 is initially set by an REC pulse generated in the recognition timing circuit 310 when the recognition signal level REC is generated. The setting of the flip-flop 415 disables the output AND gate 429 and prevents the positioning flip-flop 430 from being set until the feature signals are correctly positioned.

The first and second advance pulses produced by the AND gate 304 positions the feature signals as shown in columns 2 and 3 in FIGURE 3. When the feature signals are positioned as shown in column 3, the black elements stored in the 15th stages of both shift registers activate the OR gate 412 which in turn activates the AND gate 420. The activation of the AND gate 420 resets the flip-flop 415 and denotes that the top of the character feature signals has been located. An enabling signal is applied to the output AND gate 429. The next advance pulse generated by the advance pulse control circuit 300 positions the feature signals as shown in column 4 of FIGURE 3. In this position, the feature signals are not correctly positioned inasmuch as the botom thereof has not been located. The next advance pulse causes the black elements to be stored in the shift registers 136 and 138 in the column 5 position. When the feature signals have been advanced to the column 5 position, the feature signals are correctly positioned. The OR gate 416 is activated by the black elements in the 17th stages of the registers 136 and 138 and the AND gate 424 in turn is activated by the output of the OR gate 416. The output AND gate 429 is activated and the positioning flip-flop 430 is set thereby disabling the AND gate 304 and blocking the generation of further advance pulses in the advance pulse control circuit 300.

The manner in which the apparatus operates to recognize the features, i.e., the strokes, in the particular characters is described in detail in the copending Klein et al. application referred to above. Further description is not necessary for an understanding of this invention. Suffice it to say that when the vertical stroke feature signals in the registers 136 and 138 are correctly positioned, the stroke detectors and the height detector (not shown) identify the strokes represented by the signals and measure the height of the character. The center or zone 2 logic circuits (not shown) measure the various features detected in zone 2 during the scanning of the character. All of the feature signals detected in the various detectors are thereupon applied to a decoder 350 (FIGURE 1). The decoder synthesizes the various feature signals to produce a signal denoting a recognized character. The time selected to apply the feature signals to the decoder 350 is determined by the longest time it takes for stroke feature signals to be correctly positioned in the shift registers 136 and 138. This time is denoted by a timing pulse from the pulse generator 102 which is termed an $ESTP_5$ pulse or end of scan timing pulse 5. The $ESTP_5$ pulse occurs 26 elements or 28.6 microseconds after an $ESTP_1$ pulse. An $ESTP_1$ pulse is defined as the timing pulse which occurs immediately after the last element 22 in the bottom of the raster 25 of FIGURE 2 in each scanline. The delay introduced between the $ESTP_1$ and $ESTP_5$ pulses is sufficient to advance the feature signals through all of the stages of the shift registers 136 and 138 to determine the correct position. An $ESTP_5$ pulse actually occurs after the retrace interval and during the next active scan of the document 12. Thus, the video signals are blanked (not shown) during the entire recognition timing cycle REC.

The decoder 350 is activated when the $ESTP_5$ pulse is generated to produce a signal corresponding to the recognized character. The output signal of the decoder 350 is applied to an encoder 450 which produces a binary coded output signal representing the recognized character. The binary coded signal is applied to a computer 600 to provide an input for the computer.

Referring back to FIGURE 2, the description of scanning a handwritten mark, the long vertical mark 20, will now be given. The long vertical handwriten mark 20 is shown in FIGURE 2 as occupying the complete height of the scanning raster 25 and is 5 elements wide. Such a mark may for instance be made by a No. 2 lead pencil. It is to be recalled that each element 22 is substantially 7 milli-inches wide and a normal pencil point from a No. 2 pencil will produce a 35 milli-inch stroke, which stroke is approximately 5 elements wide. The character reader will read thinner or thicker marks but the mark made by a No. 2 pencil is the one most commonly encountered.

Figure 4:
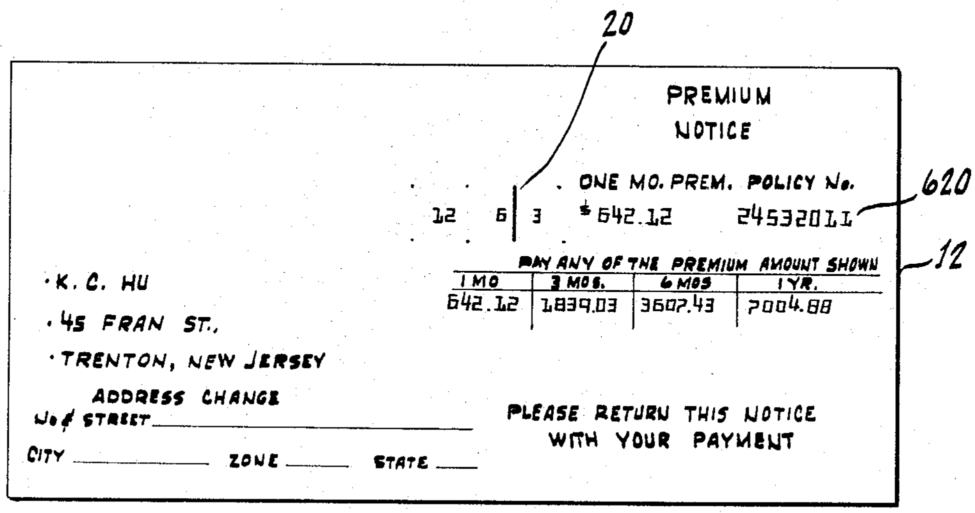

The long vertical mark 20 is shown as occupying the entire height of the scanning raster 25 to denote the fact that the mark will be made appreciably longer than a normal printed character. This is more clearly shown in FIGURE 4 which is a life sized reproduction of a turn-around document that may be read by a character reader embodying the invention. The long vertical mark 20 on the document 12 in FIGURE 4 is made greater in height than the normal printed numerals. The character reader recognizes the long vertical mark 20 by the greater duration in the feature signals produced when vertically scanning such a mark. Therefore, it is important that a handwritten mark be made greater in height than a printed character. However, the handwritten mark need actually be only 18 elements high in the raster 25 in FIGURE 2 as will be described in more detail subsequently.

The first scan of the mark 20 in the raster 25 of FIGURE 2 produces a feature signal which is advanced through the preliminary shift register 130 to activate the vertical stroke detector 180, the scan counter 170, and the shift register control circuit 140. The zoning circuit 270, which is initially reset to zone 1 by the end of a previous character, gates the feature signal from the long vertical mark 20 through the shift register control circuit 140 so as to flow through the leadline 500 and the OR gate 503. The feature signals are advanced into the shift register 136 and fill all of the stages in this register with black elements. The second scan of the long vertical mark 20 also flows through the shift register control circuit 140 to the first shift register 136. Both scans of the long vertical mark 20 are detected by the vertical stroke detector 180 as a long vertical stroke and the stroke counter 254 counts each scan as a stroke. Therefore, the zoning circuit 270 and stroke counter 254 gate the shift register control circuit 140 to deactivate the leadline 500 and no more stroke feature signals flow into the shift register 136 via this path. However, it is desirable that more than two scans of a handwriten mark 20 be stored in the shift register 136. This is because the handwriten marks 20 may be made so badly curved that two scans of the mark 20 may not be detected as long vertical marks. Accordingly, another path from the preliminary storage shift register 130 to the shift register 136 is added to the character recognition 19 by a control circuit 504.

The control circuit 504 includes an AND gate 505, the output of which is coupled to the OR gate 503. One input of the AND gate 505 is derived from the last stage of the preliminary storage shift register 130 while the other input thereof is derived from the "0" output terminal of a flip-flop 506. The flip-flop 506 is reset to produce an output from the "0" terminal thereof by an ERP pulse produced at the end of scanning the previous character. Thus, the AND gate 505 is activated when a black element appears in the last stage of the shift register 130 and the flip-flop 506 is reset. The flip-flop 506 is set by a pulse from an AND gate 507. The AND gate 507 is activated to set the flip-flop 506 when the following conditions coincide, (1) the stroke counter 254 has advanced to a count of two (C2), (2) the vertical stroke detector 180 detects the absence of a long vertical stroke $(\overline{LVS})$, and (3) an end of scan timing pulse ($ESTP_2$) occurs. An $ESTP_2$ pulse occurs 1.1 microseconds after an $ESTP_1$ pulse. When scanning a long vertical handwritten mark, these conditions, in practice, never occur simultaneously. Thus, further scans of the handwritten mark 20 are advanced into the shift register 136.

At the end of a scan count of 4, the zoning circuit 270 generates a zone 1 to zone 2 transition signal even though the transition from scanning a vertical stroke has not been detected. Therefore, the feature signals generated from the fifth scan of the long vertical mark 20 flows from the shift register control circuit 140 through the leadline 502 to the second shift register 138. The black elements from this scan would also completely fill all of the shift register stages of the register 138.

The end character pulse circuit 320 generates an end character pulse after detecting the absence of feature signals at the end of scanning the mark 20. The end character pulse is applied to activate the recognition timing circuit 310 and a plurality of advance pulses are applied from the AND gate 304 to position the signals stored in the shift registers 136 and 138. However, since the black elements from the long vertical mark feature signals completely fill all of the stages of the shift registers 136 and 138, the positioning circuit 410 cannot center these signals. Thus, the shift registers 136 and 138 are kept cycling.

A handwritten mark sensing circuit 510 detects the continuous cycling of the shift registers 136 and 138. The sensing circuit 510 includes an AND gate 512 having one input derived from the "0" output terminal of the positioning flip-flop 430 and another input coupled to the pulse generator 102 to receive an end position pulse (EPP). The EPP pulse is generated one timing pulse time prior to an $ESTP_5$ pulse. It will be recalled that an $ESTP_5$ pulse is generated to activate the decoder 350 to synthesize the various feature signals into a recognized character.

The AND gate 512 is activated by an EPP pulse to set a long vertical mark flip-flop 514 when the feature signals in the shift registers 136 and 138 cannot be positioned. The setting of the flip-flop 514 deactivates the AND gate 304 in the advance pulse control circuit 300 to prevent the generation of more advance pulses. Initially, the flip-flop 514, by being reset by an ERP pulse at the end of a previous character, had kept the AND gate 304 enabled.

The output signal LVM from the "1" output terminal of the flip-flop 514 denotes the presence of a handwritten mark and is applied to disable the decoder 350. The small circle on the decoder 350 indicates that a LVM output signal inhibits the decoder 350. The decoder 350 is therefore disabled when an $ESTP_5$ pulse is generated and therefore cannot produce a recognized character signal. The LVM output signal is also applied to the encoder 450 to be directly encoded into binary form to serve as an input to the computer 600.

It is to be noted that the positioning circuit 410 (FIGURE 3) does not require that the feature signals derived from a long vertical handwritten mark occupy all of the stages in the shift registers 136 and 138. If the feature signals from such a mark occupy 18 stages of these registers, a handwritten mark will be detected.

It is also to be noted that there are a variety of other sensing circuits which may be utilized to recognize a handwritten mark. This is because the recognition is based on the greater height of a handwritten mark as compared to a printed character.

The ability of a character reader to sense a handwritten mark greatly increases the utility and flexibility of such a reader. One use of a handwritten mark on a document 12 is shown in FIGURE 4. This document is a premium notice which is mailed by an insurer to an insured to notify him of a premium payment. The insured is given the opportunity of paying any one of a one month, a three month, a six month, or a one year payment, which amounts are listed on the document. When the premium notice is returned with a payment for one of the listed periods, a clerk compares the payment with the listed periods and makes a handwritten mark after the listed period.

In the example shown, the payment received is $1839.03 so the clerk makes a handwritten mark to the left of the numeral "3" in the line referenced by the numeral 620. If the payment had been for a month period, the mark would have been made to the left of the $642.12 amount listed as the monthly premium on the line 620. Similarly, a six month or twelve month payment would have been denoted by a mark made to the left of the numbers 6 and 12, respectively, in the line 620. The character reader reads the line 620 of information. Thus, the document 14 is positioned by the transport mechanism so that all of the information on this line is scanned. With a left-to-right motion of the document, the policy number is the first information grouping which enters the computer. The one month premium amount is the second information grouping entered into the computer. The numeral "3" is then read into the computer. The next signal input after the numeral "3" is a control signal generated by the long vertical mark 20. The control signal indicates to the computer 600 that the one month payment of $642.12 is to be multiplied by a stored multiplication factor and the amount $1839.03 is to be added as a credit to the insured. It is to be noted that there are many possible uses of the handwritten mark other than the one described.

Thus, in accordance with the invention, a character reader exhibits the capability of reading characters printed on a document as well as handwritten marks made thereon. This ability increases the flexibility and usefulness of such a reader.

What is claimed is:

1. In a character reader for reading a document having informational data printed thereon, said printed informational data exhibiting outline traces in the form of printed characters, said document having additional informational data made thereon, said additional informational data comprising a long vertical continuous mark made among said printed characters to exhibit a height substantially greater than the height of said printed characters, the combination comprising, scanning means coupled to scan one or more of said printed characters prior to scanning said continuous mark so as to derive character feature signals before deriving a continuous mark feature signal;

said scanning means coupled to vertically scan both said continuous long vertical mark and said printed characters to derive a continuous mark feature signal from said continuous long vertical mark that is substantially longer in duration than said character feature signals derived from said printed characters;

sensing means coupled to said scanning means to provide a mark recognition signal when said continuous mark feature signal exceeds a predetermined duration greater than the duration of said character feature signals;

recognition means coupled to recognize said printed characters from said character feature signals; and means coupled to said sensing means for generating a control signal to distinguish said mark from said printed characters.

2. The combination in accordance with claim 1 that further includes, means for applying an inhibiting signal to inhibit said recognition means for the duration of said mark recognition signal to prevent the recognition of said printed characters, and means for activating said recognition means after the end of said mark recognition signal to recognize characters read after the scanning of said continuous long vertical mark.

3. The combination in accordance with claim 1 wherein said continuous long vertical mark comprises a continuous long vertical handwritten mark.

4. The method of adding information to and extracting information from a document which contains characters machine printed thereon comprising the steps of;

making a continuous long vertical handwritten mark on said document adjacent said characters subsequent to the printing of said characters and substantially greater in height than the height of said characters;

vertically scanning said document to derive character feature signals and a continuous mark feature signal corresponding respectively to the heights of said printed characters and said handwritten mark;

sensing said continuous mark feature signal to provide a mark recognition signal when the duration of said continuous mark feature signal exceeds a predetermined duration greater than the duration of said character feature signals;

generating a control signal from said mark recognition signal; and utilizing said control signal to add differing information to the information printed on said document by said printed characters depending upon which printed character said continuous long vertical handwritten mark is made adjacent.

References Cited

UNITED STATES PATENTS

| | | | |
|---|---|---|---|
| 2,963,683 | 12/1960 | Demer et al. ______ | 340—146.3 |
| 3,058,093 | 10/1962 | Vernon et al. ______ | 340—146.3 |
| 3,201,752 | 8/1965 | Rabinow __________ | 340—146.3 |
| 3,213,420 | 10/1965 | Eckert ____________ | 340—146.3 |
| 3,217,294 | 11/1965 | Gerlach et al. ______ | 340—146.3 |

MAYNARD R. WILBUR, *Primary Examiner.*

MALCOLM A. MORRISON, *Examiner.*

J. E. SMITH. J. I. SCHNEIDER, *Assistant Examiners.*